United States Patent Office 3,288,753
Patented Nov. 29, 1966

3,288,753
HARDENING OF EPOXIDE RESINS WITH A DIAMINODIPHENYL KETONE
Graham Winfield, Harlton, Cambridgeshire, Edward William Garnish, Saffron Walden, Essex, and Malcolm Paul Rainton, Cambridge, England, assignors to Ciba Limited, Basel, Switzerland, a Swiss company
No Drawing. Filed Feb. 5, 1962, Ser. No. 171,270
Claims priority, application Great Britain, Feb. 20, 1961, 6,227/61
4 Claims. (Cl. 260—47)

This invention relates to the hardening of epoxide resins and more particularly to the hardening of epoxide resins by amino-substituted diphenyl ketones. The invention further includes compositions containing such hardening agents and epoxide resins, and hardened products obtained therefrom.

Aromatic polyamines are extensively used as curing agents for epoxide resins. To serve in this capacity they must be dissolved in the resin and dissolution is normally achieved by warming the mixture. Once a homogeneous solution has been prepared it may be cooled and allowed to solidify. The solid so obtained is known as a B-stage product; it is a partial reaction product of the resin and the amine, which remains fusible, often for a period of months, and can subsequently be cured by heating without further addition of hardening agent. Alternatively the resin-hardener solution may be used immediately after preparation and while still in the liquid state.

Many aromatic polyamines have been proposed as hardeners for epoxide resins; examples are benzidine, phenylene diamines, tolylene diamines, diaminodiphenylmethanes, and diaminodiphenylsulphones. They have advantages over other available types of hardener in that they form compositions that cure rapidly at elevated temperature to give products with high flexural deformation temperatures.

A high flexural deformation temperature is a very desirable property in a cured epoxide resin but it is not the sole criterion by which the high temperature performance must be judged. Service conditions often require that a cured resin be held at an elevated temperature for prolonged periods of time and it is essential, under such conditions, that thermal degradation should not occur to an extent which impairs performance.

Epoxide resins are widely used in the electrical and electronics industry, notably as insulating materials, sealing agents and potting compounds, and in these applications it is necessary that both the electrical and mechanical properties should meet very exacting requirements.

While the properties exhibited by the cured resin are of great importance it is necessary in addition that the properties of the uncured resin-hardener system should be such as to facilitate application. For instance, the pot-life of the uncured liquid composition, i.e. the time elapsing between preparation and the onset of gelation, must be sufficiently long to permit fabrication of the required shape or structure, and the shelf life of the B-stage product, i.e. the time for which it remains fusible, must be such as to allow a lengthy storage life for pre-impregnated fabrics or moulding powders containing it.

No known aromatic polyamine exhibits all these desirable properties to a satisfactory extent.

Compositions based on epoxide resins, when cured, may have a high flexural deformation temperature but not be stable at that temperature; such instability may result in a rapid loss in weight which may be accompanied by gross changes in physical structure. In such cases the maximum working temperature of the composition is much lower than the flexural deformation temperature. Moreover, it is particularly difficult to obtain good mechanical properties when the flexural deformation temperature is high, and consequently the usefulness of the cured product is limited, for it can only be employed in non-stressed or low stressed structures.

According to the present invention there is provided a curable composition which comprises at least one epoxide compound containing $n$ epoxide groups per molecule calculated on the average molecular weight of the compound, where $n$ is greater than 1, and as a hardener therefor, a diaminodiphenyl ketone of the general formula:

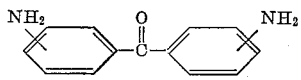

the total proportion of amine hardener in the composition being such that there is present one active amino hydrogen atom in the hardener to each epoxide group in the epoxide compound.

The aforesaid compositions may include fillers, accelerators, diluents or other additives.

The hardeners employed in the compositions of the present invention combine many of the desirable properties described above. They form, with epoxide resins, B-stage compositions having excellent storage life at room temperature, and are therefore eminently suitable for the preparation of pre-impregnated fabrics for laminates, moulding powders and one-component adhesives. They rapidly effect cure at elevated temperature to form products which are resistant to thermal degradation and have high flexural deformation temperatures. The resulting cured products have very good mechanical and electrical properties, and can be used in load bearing structures where a longworking life at elevated temperatures is demanded. It is a further advantage of the cured compositions that they have little or no tendency to discolour under the influence of light, air or common chemical agents.

Specifically the hardeners employed in the compositions of the present invention are the 4,4'-; 3,3'-; 2,2'-; 4,3'-; 4,2'-; and 3,2'-diaminodiphenyl ketones. Mixtures of such compounds may be used. These polyamines may also be used admixed with other epoxy hardeners, for example other classes of aromatic polyamines, to produce special effects such as reduction in the melting point of the hardener.

As epoxide compounds there may be used such esters as are obtainable by the reaction of a di- or polybasic carboxylic acid with epichlorohydrin or dichlorohydrin in the presence of an alkali. Such polyester may be derived from aliphatic dicarboxylic acids, such as oxalic acid, succinic acid, glutaric acid, adipic acid, pimelic acid, suberic acid, azelaic acid, sebacic acid, and especially aromatic dicarboxylic acids, such as phthalic acid, isophthalic acid, terephthalic acid, 2:6-naphthalene-dicarboxylic acid, diphenyl-ortho:ortho'-dicarboxylic acid, ethylene glycol bis-(para-carboxy-phenyl)ether or the like. Others which may be used are, for example, diglycidyl adipate and diglycidyl phthalate, and also diglycidyl esters which correspond to the average formula:

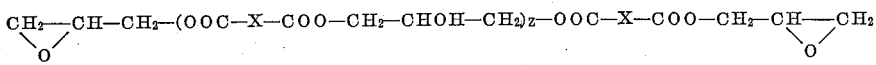

in which X represents an aromatic hydrocarbon radical, such as a phenyl group, and Z represents a small whole number or a small fractional number.

There may also be employed the polyglycidyl ethers such as are obtainable by the interaction of a dihydric or polyhydric alcohol or a diphenol or polyphenol with epichlorohydrin or related substances, for example glycerol dichlorohydrin, under alkaline conditions or alternatively in the presence of an acidic catalyst with subsequent alkaline treatment. These compounds may be derived from glycols, such as ethylene glycol, diethylene glycol, triethylene glycol, propylene glycol-1:2, propylene glycol-1:3, butylene glycol-1:4, pentane-1:5-diol, hexane-1:6-diol, hexane-2:4:6-triol, glycerine and especially diphenols or polyphenols such as resorcinol, pyrocatechol, hydroquinone, 1:4-dioxynaphthalene, 1:5-dioxynaphthalene, phenol-formaldehyde condensation products, bis-(4-hydroxyphenyl)-methane, bis-(4-hydroxyphenyl)-methyl-phenylmethane, bis-(4-hydroxyphenyl)-tolylmethane, 4:4'-dioxydiphenyl, bis-(4-hydroxyphenyl)sulphone and (for preference) 2:2-bis-(4-hydroxyphenyl)propane. There may also be employed ethylene glycol diglycidyl ether and resorcinol diglycidyl ether, and also diglycidyl ethers which correspond to the average formula:

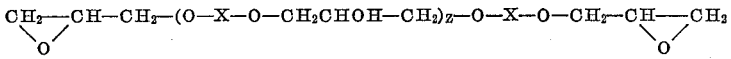

in which X represents an aromatic radical, and Z represents a small whole number or fractional number.

Especially suitable epoxide resins are those that are liquid at room temperature, for example, those obtained from 4:4'-dioxydiphenyl-dimethylmethane (Bisphenol A), which have an epoxide content of about 3.8 to 5.88 epoxide equivalents per kilogram. Such epoxide resins correspond, for example, to the average formula:

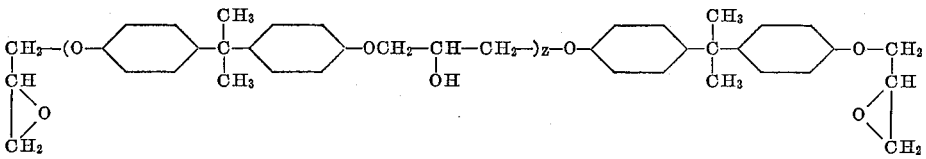

in which Z represents a small number or small fractional number, for example, between 0 and 2.

The following examples will serve to illustrate the invention. The parts referred to are parts by weight.

*Example I*

100 parts of a liquid epoxide resin, prepared by the interaction of epichlorohydrin and Bisphenol A, and having an epoxide value of 5.06 equivalents/kg. were heated to 170° C. and 28.5 parts of 4:4'-diaminodiphenyl ketone were stirred in. Stirring was continued until the ketone had completely dissolved and the solution was then cooled rapidly to room temperature. This solution was converted to a solid B-stage resin by storing at room temperature for 48 hours. For comparison purposes, a B-stage resin was similarly prepared by heating to 120° C. 100 parts of the same epoxide resin and 27 parts of diaminodiphenyl methane, which is a most extensively used aromatic amine hardener.

In Table 1 the storage lives of these B-stage resins are compared at 40° C.

TABLE 1

| Days at 40° C | 1 | 2 | 3 | 7 | 10 | 15 | 29 | 52 |
|---|---|---|---|---|---|---|---|---|
| Softening point of B-stage prepared with 4:4'-diaminodiphenyl ketone, ° C | 64 | 78 | 92 | 96 | 99 | 101 | 110 | 106 |
| Softening point of B-stage prepared with 4:4'-diaminodiphenyl methane, ° C | 82 | 90 | 95 | 95 | 116 | Infusible | | |

*Example II*

In Table 2 the effect of the hardening agent on the mechanical properties of the cured resin is illustrated, and the hardening agents of the present invention are again compared with the conventional 4:4'-diaminodiphenyl methane. The resin here used was the same as that used in Example I, and a similar procedure was employed when dissolving the hardening agents in the resin. The mechanical tests were carried out on cast specimens which were made by pouring the heated resin-hardener solution into a mould of prescribed dimensions and subsequently heating for 1 hour at 120° C. followed by 3 hours at 180° C. before removing from the mould.

Tests were carried out in conformity with procedures laid down and published by the American Society for Testing Materials and the reference number for each test is included in the table.

TABLE 2

| Test or Property | Test Method Used | Hardener mixed with 100 parts of resin | | |
|---|---|---|---|---|
| | | 27 parts 4:4'-diaminodiphenyl methane | 28.5 parts 4:4'-diaminodiphenyl ketone | 28.5 parts 3:3'-diaminodiphenyl-ketone |
| Heat deflection temperature | ASTM D648-56 | 151° C | 183.5° C | 140° C. |
| Flexural strength | ASTM D790-59T | 1,217 kg./sq. cm | 1,223 kg./sq. cm | 1,603 kg./sq. cm. |
| Modulus of elasticity by flexure | ASTM D790-59T | 2.52×10⁴ kg./sq. cm | 3.02× 10⁴ kg./ sq. cm | 3.23×10⁴ kg./sq. cm. |
| Compressive strength | ASTM D695-54 | 2,375 kg./sq. cm | 2,265 kg./sq. cm | 2,450 kg./sw. cm. |
| Compressive yield stress | ASTM D695-54 | 1,200 kg./sq. cm | 1,426 kg./sq. cm | 1,485 kg./sq. cm. |
| Tensile strength | ASTM D638-58T | 635 kg./sq. cm | 482 kg./sq. cm | 817 kg./sq. cm. |

What is claimed is:

1. A curable composition which comprises a 1,2-epoxide compound having a 1,2-epoxide equivalency greater than 1 and as a hardener therefor, a diaminodiphenyl ketone of the general formula

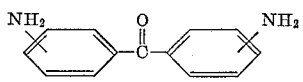

wherein the total proportion of amine hardener in the composition is such that there is present one active amino hydrogen atom in the hardener to each 1,2-epoxide group in the 1,2-epoxide compound.

2. A composition as claimed in claim 1, wherein the hardener is 4,4'-diaminodiphenyl ketone.

3. A composition as claimed in claim 1, wherein the hardener is 3,3'-diaminodiphenyl ketone.

4. A composition according to claim 1, wherein the 1,2-epoxide compound is a polyglycidyl ether of a polyhydric phenol.

References Cited by the Examiner

UNITED STATES PATENTS

| 1,787,065 | 12/1930 | Calcott et al. | 260—570 XR |
| 2,773,048 | 12/1956 | Formo et al. | 260—47 |
| 2,801,229 | 7/1957 | De Hoff et al. | 260—47 |
| 2,981,711 | 4/1961 | Meyer et al. | 260—834 |

OTHER REFERENCES

Skiest, "Epoxy Resins," page 29 relied on, Reinhold Pub. Corp., New York, 1958.

Whitmore, "Organic Chemistry," 2nd Edition, p. 713 relied on, 1951.

Lee et al., "Epoxy Resins," p. 52 relied on, 1957.

WILLIAM H. SHORT, *Primary Examiner.*

JOSEPH L. SCHOFER, T. D. KERWIN,
*Assistant Examiners.*